July 16, 1957 P. JEPSON 2,799,437
SEPARATOR FOR USE IN SEPARATING LIQUIDS OF
DIFFERENT SPECIFIC GRAVITY
Filed Oct. 18, 1954
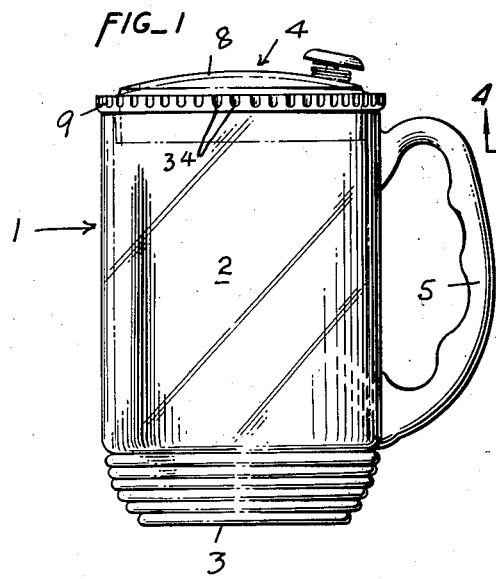
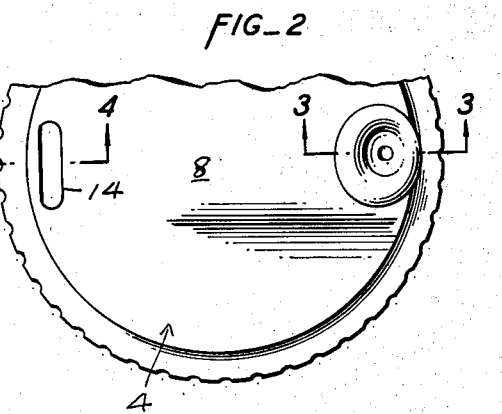
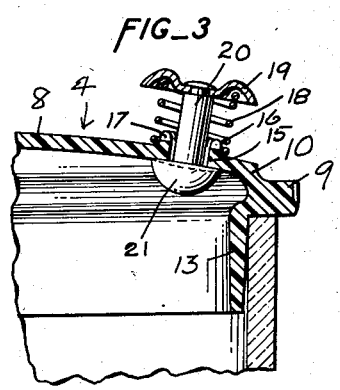
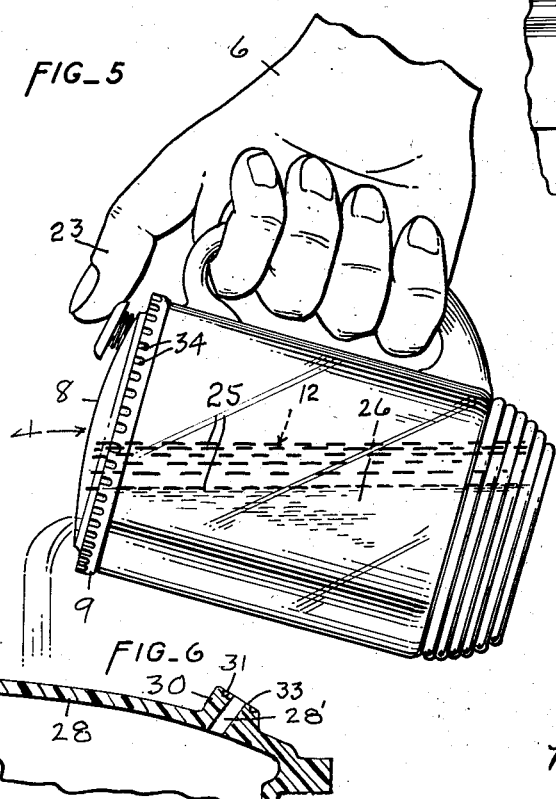
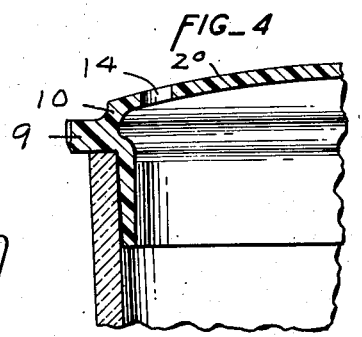
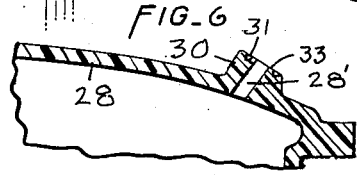
INVENTOR.
PERCY JEPSON
BY
Boykin, Mohler & Wood
ATTORNEYS

United States Patent Office 2,799,437
Patented July 16, 1957

2,799,437

SEPARATOR FOR USE IN SEPARATING LIQUIDS OF DIFFERENT SPECIFIC GRAVITY

Percy Jepson, Oakland, Calif.

Application October 18, 1954, Serial No. 462,816

1 Claim. (Cl. 222—481)

This invention relates to a vessel adapted to be used for draining a liquid having one specific gravity from that of another having a lower specific gravity, a particular example being the draining of water from grease after the latter has risen above the water and is supported thereon, hence for purpose of identification the present vessel may be designated a grease saver, although not necessarily restricted to that user.

Heretofore most grease savers have provided a drain opening in the bottom of a vessel, and a manually operated closure for such opening, which structure was hard to clean, costly, and not entirely accurate due to the fact that unless the bottom included a sump, it was very difficult to observe the exact line of division between the water and the fat, and slight tilting of the vessel would result in a discrepancy between the lower level of the fat at the side of the vessel where the observation was being made and the outlet opening where the liquid was being discharged. If a sump were provided, then observation would also be difficult because the vessel would have to be lifted in order to see the sump and also the vessel would require legs or a base to support it.

The foregoing objections do not take into consideration the difficulty of keeping valves clean where immersed in liquid and the difficulty of their maintenance, to say nothing of the cost that is involved in making the device.

One of the main objects of this invention is the provision of a grease saver that enables the observer to have a clear and accurate view of the liquid in the vessel at all times and more particularly, to have a clear and readily observable view of the liquid all the way to the discharge opening, and which grease saver is provided with simple means for stopping the flow of liquid instantly, as soon as the lower fat level reaches the discharge opening.

Another object of the invention is the provision of a grease saver that does not have a projecting spout, sump or the like, nor legs, any of which are likely to be broken or to catch on articles when the grease saver is handled, whereby the grease saver is safer to handle than heretofore, and less likely to be injured, and is readily cleaned.

A still further object of the invention is the provision of a vessel for use in separating liquids of different specific gravity, and which vessel is more easily cleaned than heretofore and more economical to make and easier to use, and which vessel also enables the user to more accurately effect a separation of one liquid from another.

Other objects and advantages will appear in the description and drawings.

In the drawings,

Fig. 1 is a side elevational view of the vessel that comprises the grease saver.

Fig. 2 is a fragmentary enlarged plan view of the vessel of Fig. 1.

Fig. 3 is an enlarged fragmentary sectional view of the top of the fat saver as taken along line 3—3 of Fig. 2.

Fig. 4 is an enlarged fragmentary sectional view taken along line 4—4 of Fig. 2.

Fig. 5 is an elevational view of the vessel in use with the thumb of the hand holding said vessel in a position for controlling the flow.

Fig. 6 is an enlarged fragmentary sectional view similar to that of Fig. 3 but showing a slightly different structure.

In detail, the vessel comprising the grease saver, may be a pitcher like body 1 having sides 2, a bottom 3 and a top or cover 4. For convenience in making a close fitting top and for economy of manufacture as well as ease of cleaning, the body 1 of the vessel is preferably cylindrical.

A handle 5 is formed or secured to the body 1, projecting from one side of the latter for grasping by the hand 6 of the operator (Fig. 5).

Preferably, the body 1 of the vessel is of glass and is transparent, and the cover 4 is also preferably transparent, and is formed of somewhat flexible plastic material that is resistant to injury and distortion under the influence of heat.

The body of the vessel has a smooth sided, cylindrical upper marginal portion. The inner side may have a very slight inward inclination in direction toward the bottom of the body of, say, about 1 degree.

The cover or top 4 is dome shaped as at 8 with the convex side uppermost and has a planar substantailly circular flange 9 around its outer periphery that is adapted to seat against the circular axially facing rim of the receptacle.

An upward projecting shoulder 10 integral with the dome 8 and flange 9 connects the two and offsets the dome 8 upward, slightly so that at level 12 any liquid (Fig. 5) in the receptacle and against the dome 8 can be readily seen by an operator looking at the cover from a lateral side of the receptacle at any level of the liquid in the receptacle when such receptacle is tilted for pouring liquid therefrom. This dome shaped top is an important feature of the invention, as will later appear more clearly.

Integral with the inner edge of the circular flange 9 is a depending annular flange 173 that may have a slight inward slant of say 2 to 3 degrees in direction axially downwardly of the top. This flange 13 is adapted to snugly fit within the upper end of the receptacle 1 in liquid and airtight relation to said receptacle.

The slight flexibility of the material from which the cover, including flange 13, is made enables the flange 13 to accommodate itself to any slight irregularities in the vessel so as to insure a water-tight and substantially air-tight seal between the flange and the glass receptacle, yet the cover can be easily removed for cleaning and for filling the receptacle.

Adjacent to flange 9 is a horizontally elongated slot or pouring opening 14 (Fig. 2). This slot may be several times as long in direction at right angles to the axis of the receptacle and cover, as it is wide, and the width may be about an eighth of an inch.

At the opposite side of the axis of the cover and vessel from the pouring opening 14 and adjacent to the flange 9, is an opening 15 (Fig. 3) and an annular boss or flange 16 coaxial with said opening 15 projects upwardly from the upper side of the cover around said opening. This boss or flange may be notched at 17 one or more points around the axially upwardly facing side.

A helical spring 18 coaxial with the flange 16 encloses said flange at its lower end and reacts between a finger engageable disc 19 and the top on cover 4.

A shaft 20 is centrally secured to disc 19 at its upper end and extends loosely through the opening 15 leaving a space between said shaft and opening for air. A valve element 21 is secured to the lower end of the shaft and said element is circular making a sealing line contact at its periphery with the inner or lower surface of the cover 4 around the opening 15 which is held by the spring.

Upon depressing the shaft 20 by exerting downward pressure on disc 19, the valve 21 will be opened, and even if the disc 21 is fully depressed, the flow of air through the opening 15 will not be shut off due to notches 17.

The central portion of disc 21 may be depressed to afford more frictional resistance between the thumb 23 (Fig. 5) of the hand 6 than were the disc rounded or smooth. This overcomes any tendency for the thumb to slip off the disc. Also, the downwardly opening annular channel formed by depressing the central portion of the disc forms a seat for the upper end of spring 18 so as to hold the spring coaxial with shaft 20.

The entire assembly of the disc 19, shaft 20 and valve element 21 may be termed a thumb actuatable valve with the opening 15 an air inlet opening.

The dimensions of the pouring opening 15 are such that the liquid within the receptacle, which may be a top layer 25 of hot grease and the balance 26 therebelow of hot water, will not flow out of the opening 14 as long as the air inlet 15 is closed. The air inlet and the thumb actuatable valve that constitutes a closure for said inlet, are so positioned that the thumb 23 of the hand 6 will naturally and easily be in a position for depressing said valve when the handle 5 is held by the fingers of hand 6 in pouring position (Fig. 5).

It is pertinent to note that the liquid does not and cannot engage the valve since it is elevated above the upper edge of the vessel 1 when the latter is upright and the cover is on the latter. Also the opening 14 is spaced above the highest possible liquid level.

Upon tilting the vessel to cause pouring, the liquid level will be even farther spaced from the valve than before. This structure enables the disc 19 to remain relatively cool so as to cause no discomfort to the thumb 23 even when this liquid is quite hot.

In actual practice, in separating the grease from the water, the operator preferably tilts the body 1 until the layer 25 of grease is well above the opening 14 and then opens the valve. The water will be discharged through the opening 14 and as the lower level of the grease layer descends, which action is readily seen through the dome top in looking at the top edgewise or from the side, the vessel may be progressively tilted until all of the water is drained from below the grease. By releasing the valve when the grease layer reaches or almost reaches the opening 14 the pouring will cease and the grease will remain in the receptacle.

A very accurate separation can be obtained by the above mentioned operation and with the structure described.

In Fig. 6 the top or cover 28 is identical with the top 4 with the exception that the air inlet aperture 28' is not provided with a valve. However, a boss or flange 30 is around said aperture and projects above the top 28 and this flange may be somewhat higher than flange 16. The aperture 28' also may extend through the boss 30 at an angle of about 45 degrees relative to horizontal with the axis of said aperture extending downwardly toward the actual axis of the vessel. Also the upper surface of the boss may be formed with a slight annular groove 31 around the aperture and the upper surface 33 of said boss may be slanted to facilitate direct sealing engagement with the thumb 23.

By this structure the thumb engaging surface of the boss will remain cool and in withdrawing water from below the grease the operator will keep the thumb over the aperture until the water is to be withdrawn, then the thumb is removed, and to again stop the flow, the thumb is placed over the opening.

In both forms of the invention it is pertinent to note that the sealing flange on the cover is relatively wide, so as to make a good sealing contact with the vessel.

In both forms of the invention the handle is so positioned that the thumb is in operating position over the cover and over the air inlet for controlling the flow when the handle is held by the fingers. This is true irrespective of whether or not a valve is in the air inlet.

In both forms of the invention the pouring opening and air inlet are at diametrically opposite points in the dome shaped top, and in both forms, there is a raised boss around the inlet that projects above the cover and that creates a resistance of transfer of heat.

The flange 9 around the cover may be serrated, as at 34, if so desired, although this is not absolutely essential. The serrations may assist, at times in providing added resistance to the slippage of the fingers in rotating the cover to loosen it, should it otherwise be rather tight, or in rotating the partially installed cover to properly position the air inlet and outlet substantially in the same place as that in which the handle is positioned.

In both forms of the invention the pouring opening 14 is elongated, thus enabling a rapid flow of liquid and at the same time restricting solids that may otherwise tend to be discharged, and also reducing the cross-sectional area of the opening sufficiently to prevent flow of liquid when the air inlet is closed.

The word "transparent" is applied to the material of the vessel and to the cover is intended to include any suitable material through which an observer can readily perceive the line of division between water and grease. For example, a housewife or cook, in using the device, will place in the vessel the water containing grease as the result of a cooking operation and the grease will quickly rise to form a distinctly differently colored layer 25 from the water therebelow. The water can then be readily drained off.

This top wall or cover may be semi-transparent, or translucent, therefore the word "transparent" as used in the description and claim is intended to cover any material through which the observer can distinguish the line of division between the layers of liquids of different densities that are within the vessel during a draining or separating operation.

While the claim entitles the device of this invention a "grease saver," it is to be understood that this title is not a term of limitation, since the device may be used for separating any liquids that will separate into layers when mixed together, such as grease and water, etc.

I claim:

A grease saver comprising: a rigid, substantially cylindrically sided vessel of transparent material, a horizontally disposed transparent dome-shaped closure for said vessel leaving a depending annular flange around its edge frictionally seated against the inner surface of said vessel around its upper edge and a radially outwardly projecting flange integral with said top wall exactly over the said edge, said dome-shaped top wall being integral with and extending above said last mentioned flange whereby liquid within said vessel may be readily observed by a person looking through said dome-shaped top wall from an edge thereof, a discharge opening and an air inlet formed in said top wall adjacent to its opposite edges thereof and directionally opposite to each other and disposed in a plane vertically bisecting said opening, said opening being elongated horizontally and said top wall being formed with a boss projecting above said top wall and through which said inlet extends the dome of said top extending a sufficient distance upwardly to enable viewing the level of liquid within said vessel and the dividing line between grease and water when said liquid comprises grease and water in separate layers, when said cover is viewed edgewise from a side of said vessel.

(References on following page)

References Cited in the file of this patent

UNITED STATES PATENTS

| | | |
|---|---|---|
| 310,051 | Harker et al. | Dec. 30, 1884 |
| 859,157 | Warren | July 2, 1907 |
| 1,434,740 | Gibson | Nov. 7, 1922 |
| 1,710,239 | Paulson | Apr. 23, 1929 |
| 1,811,113 | Derby | June 23, 1931 |
| 2,608,841 | Rice | Sept. 2, 1952 |
| 2,687,831 | Miller | Aug. 31, 1954 |

FOREIGN PATENTS

| | | |
|---|---|---|
| 52,146 | Germany | May 22, 1890 |
| 101,908 | Germany | Mar. 3, 1899 |